UNITED STATES PATENT OFFICE.

JACOB STRAUS, OF ST. LOUIS, MISSOURI.

IMPROVEMENT IN COMPOSITION SADDLERY GOODS.

Specification forming part of Letters Patent No. 121,215, dated November 21, 1871.

*To all whom it may concern:*

Be it known that I, JACOB STRAUS, of St. Louis, in the county of St. Louis and in the State of Missouri, have invented certain new and useful Improvements in Saddlery Goods and Compositions for forming the same; and do hereby declare that the following is a full, clear, and exact description thereof.

In saddlery goods of commerce saddle-trees and stirrups are constructed of either iron or wood; if of the former, said articles are too weighty; while, when constructed of or from wood, the irregular shape of the articles renders necessary the use of a large number of pieces joined together by various means, in order to insure the required strength, by which means great skill and care are necessary in constructing said articles so as to render them sufficiently durable, and thereby their cost rendered excessive. To remedy these objections is the design of my invention, which consists, principally, as a new article of manufacture, in a saddle-tree, stirrup, or other similar articles of saddlery goods composed of molded plastic material, substantially as and for the purpose hereinafter specified. It consists also in the plastic composition used substantially as and for the purpose hereinafter shown.

The composition employed consists of the following-named ingredients, having the relative proportions shown: Wheat-bran, four and one-half pounds; glue, two and one-quarter pounds; tar, one-half pint.

The glue is first dissolved in water until it has a consistency equal to that of thick molasses, when the tar is added, and by stirring thoroughly incorporated, after which the wheat-bran is slowly sifted in and the whole mass stirred until homogeneous. The composition thus formed is placed within suitable metal molds or dies, the interior surfaces of which have been coated with molasses, and subjected to a heavy pressure, so as to not only cause it to fill each portion of said mold, but also to thoroughly expel all air and surplus moisture and give to said composition greater density. After remaining in the molds for about one hour the articles may be removed and placed in a suitable position for drying, which operation requires about six days. After having become thoroughly dry the articles are ready for use, and may either be covered with leather in the usual manner, or they may be painted and varnished so as to give them a more ornamental appearance.

The articles produced by this means are exceedingly durable, as from the manner of their construction each portion possesses equal strength, they are not affected by changes in temperature; as the tar renders the composition impervious to moisture; they are not liable to fracture from pressure or by a sudden blow, as one of the offices of said tar is to give a semi-elasticity to the mass, and in connection with the glue render the same exceedingly tough; they are more uniform in size and shape, much lighter and stronger than any similar article of commerce; and while possessing all these advantages can be furnished at a much less cost than the same.

Having thus fully set forth the nature and merits of my invention, what I claim is—

1. As a new article of manufacture, a saddle-tree, stirrup, or other similar articles of saddlery goods composed of molded plastic material, substantially as and for the purpose specified.

2. The hereinbefore-described plastic composition for use in forming articles of saddlery goods, substantially as shown.

In testimony that I claim the foregoing I have hereunto set my hand this 3d day of August, 1871.

JACOB STRAUS.

Witnesses:
GEO. S. PRINDLE,
EDM. F. BROWN.

(72)